Inventor:
Andre Bechler

Patented July 2, 1946

2,403,208

UNITED STATES PATENT OFFICE 2,403,208

DISENGAGING COUPLING

André Bechler, Moutier, Switzerland

Application January 10, 1944, Serial No. 517,729
In Switzerland January 15, 1943

2 Claims. (Cl. 192—48)

Object of the invention is a disengaging coupling.

As is well-known in automatic lathes, disengaging friction couplings are used for driving shafts, for instance camshafts to which during the productive period of the tools a smaller, during the dead period of the same, a greater speed is imparted. In these couplings and according to the speed desired different friction discs are alternately brought into mutual cooperation. A disadvantage of the known couplings of this type consists in their great length, in that between the two conical drive friction discs loosely mounted on the driven shaft and mostly formed as belt pulleys, two conical friction discs in drive connection with the shaft are provided, which, by axial displacement, are alternately brought into contact with the drive discs. It is by these two friction discs with their displacing device that a great length of the coupling becomes necessary.

According to the invention a length reduction is obtained by a connection between the displaceable friction discs, which passes through a friction disc rigidly connected with the driven shaft. In this way, the disc itself to be engaged disengages the other disc actually engaged. In this way, a displacing mechanism between the discs is no longer necessary, resulting in a considerable reduction of the length of the coupling, and this particularly in a preferred embodiment where the displaceable friction discs are cones inclined in the same direction, alternately working upon a single conical member rigidly fixed to the driven shaft.

The accompanying drawing illustrates, by way of example, one embodiment of the object of the invention.

Figure 1:
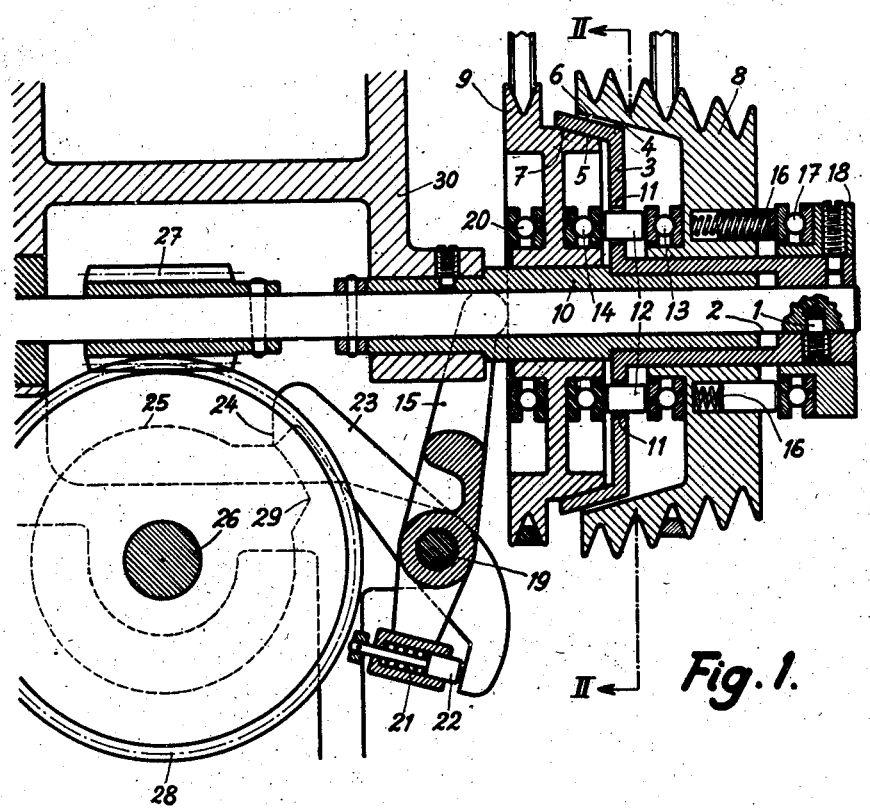
Figure 2:
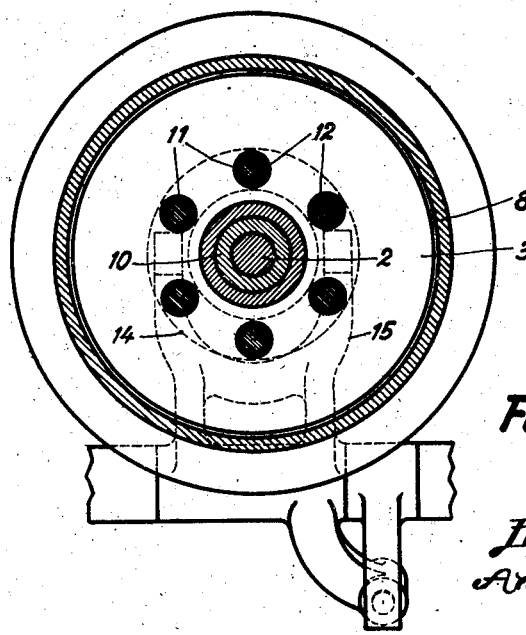

Fig. 1 is an axial section through the driven shaft, and Fig. 2 is a section along line II—II in Fig. 1.

The friction disc 3 having conical friction surfaces 4 and 5 is rigidly connected with the driven shaft 2 by means of a screw 1. This shaft 2 may, e. g., be a camshaft of an automatic lathe. The surfaces 4 and 5 are destined to engage the correspondingly inclined friction surfaces 6 and 7 of the driving belt pulleys 8 and 9 for the productive and dead time respectively. Pulley 8 is loosely mounted on the hub of the disc 3 and pulley 9 loosely on a sleeve 10 rigidly connected with the frame 30. Disc 3 has holes 11 through which pins 12 pass. These latter are supported by means of a ball bearing 13 on the pulley 8, and by means of a ball bearing 14 on the pulley 9. The pulley 9 is supported towards the left side on the forked lever 15, while the springs 16 pressing the pulley 8 towards the left provide for a pressure connection between the pulleys 8 and 9, the ball-bearings 13, 14 and the pins 12. The springs 16 bear towards the right side by means of the ball bearing 17 against a ring 18 fixed to the hub of the disc 3. The forked lever 15 mounted on the axle 19, whose fork is supported on the ball bearing 20, carries on its other end a piston 22 loaded by a spring 21, this piston making contact with the one end of a lever 23 likewise mounted on the axle 19. The other end of this lever 23 forms a feeler 24 engaging the cam disc 25, whose shaft 26 is driven by the shaft 2 by means of the toothed wheels 27, 28. The springs 16, 21 produce an elastic pressure upon both ends of the disengaging coupling.

In the position shown in the drawing, where the feeler 24 is in contact with the cam 29 of the disc 25, the dead time pulley 9 is pressed against the disc 3 and the pins 12 hold the pulley 8 at a distance from the disc 3. However, as soon as the feeler 24 falls off from the cam 29, the springs 16 press the pulley 8 against the surface 4 of the disc 3 and the pins 12 lift the pulley 9 off from the disc 3 so that the shaft 2 runs now at the productive or working speed.

It may be seen that owing to the reduction of the space between the pulleys 8 and 9 the length of the coupling is considerably shortened.

What I claim is:

1. In a disengaging friction coupling, a shaft, a friction disc rigidly connected to said shaft, displaceable friction members arranged on opposite sides of said disc to alternately cooperate therewith, an adjusting member engaged with one of the friction members, and members maintaining said friction members in spaced relation and passing through the friction disc and operable to move the other friction member in one direction upon actuation of said adjusting member.

2. A coupling as claimed in claim 1 provided with means normally tending to move the second mentioned friction member in an opposite direction, the latter movement being transmitted from the second to the first mentioned friction member through said spacing members.

ANDRÉ BECHLER.